(12) United States Patent
Yoda et al.

(10) Patent No.: US 7,956,116 B2
(45) Date of Patent: Jun. 7, 2011

(54) ELECTRONIC DEVICE CONTAINING A THERMALLY CONDUCTIVE SHEET

(76) Inventors: Masaki Yoda, Tokyo (JP); Yoshinao Yamazaki, Tokyo (JP)

( * ) Notice: Subject to any disclaimer, the term of this patent is extended or adjusted under 35 U.S.C. 154(b) by 0 days.

(21) Appl. No.: 12/569,562

(22) Filed: Sep. 29, 2009

(65) Prior Publication Data

US 2010/0020496 A1    Jan. 28, 2010

Related U.S. Application Data

(63) Continuation of application No. 11/720,121, filed as application No. PCT/US2005/039098 on Oct. 28, 2005, now abandoned.

(30) Foreign Application Priority Data

Dec. 3, 2004 (JP) ................................. 2004-351422

(51) Int. Cl.
*C08K 3/10* (2006.01)
(52) U.S. Cl. ......... 524/434; 524/305; 524/323; 524/437
(58) Field of Classification Search ................. 524/305, 524/323, 430, 431, 432, 433, 434, 437
See application file for complete search history.

(56) References Cited

U.S. PATENT DOCUMENTS

| | | | |
|---|---|---|---|
| 4,483,958 A | 11/1984 | Kosaka et al. | |
| 4,980,086 A | 12/1990 | Hiraiwa et al. | |
| 5,300,569 A | 4/1994 | Drake et al. | |
| 5,530,064 A | 6/1996 | Ashton et al. | |
| 5,756,580 A * | 5/1998 | Natori et al. | 525/100 |
| 5,852,135 A | 12/1998 | Kanai et al. | |
| 5,907,129 A | 5/1999 | Funaki et al. | |
| 5,989,459 A | 11/1999 | Nguyen et al. | |

FOREIGN PATENT DOCUMENTS

| | | |
|---|---|---|
| EP | 0 781 639 A2 | 7/1997 |
| JP | 57-3841 | 1/1982 |
| JP | 57-42750 | 3/1982 |
| JP | 59-091139 | 5/1984 |
| JP | 03-218909 | 9/1991 |
| JP | 5-171057 | 7/1993 |
| JP | 05-230341 | 9/1993 |
| JP | 5-320414 | 12/1993 |
| JP | 2615829 | 3/1997 |
| JP | 10-316953 | 12/1998 |
| JP | 10-330575 | 12/1998 |
| JP | 11-209618 | 8/1999 |
| JP | 11-292998 | 10/1999 |
| JP | 2000-150740 | 5/2000 |
| JP | 3133375 | 11/2000 |
| JP | 2001-302234 | 10/2001 |
| JP | 2001-310984 | 11/2001 |
| JP | 2002-284884 | 10/2002 |
| JP | 2003-213133 | 7/2003 |
| JP | 2003-238760 | 8/2003 |
| JP | 2004-2527 | 1/2004 |
| JP | 2004-10859 | 1/2004 |
| JP | 2004-059851 | 2/2004 |

OTHER PUBLICATIONS

"Kneading Technique for Resin/Filler System", by Technical Information Institute Co., Ltd., Mar. 31, 2001.

* cited by examiner

*Primary Examiner* — Peter D Mulcahy
(74) *Attorney, Agent, or Firm* — Dean M. Harts; Ann Kulprathipanja

(57) ABSTRACT

Provided is an electronic device comprising a thermally conductive sheet including a methacrylic polymer, a thermally conductive filler containing aluminum hydroxide in an amount of at least 10% by volume of the thermally conductive sheet, a combination of a phenolic antioxidant and a sulfur based antioxidant in an amount sufficient to impart thermal stability to the thermally conductive sheet, and a heat radiator.

14 Claims, No Drawings

ELECTRONIC DEVICE CONTAINING A THERMALLY CONDUCTIVE SHEET

CROSS REFERENCE TO RELATED APPLICATIONS

This is a continuation of application Ser. No. 11/720,121, filed May 24, 2007 now abandoned; which was a national stage filing under 35 U.S.C. 371 of PCT/US2005/039098 filed Oct. 28, 2005, which International Application was published by the International Bureau in English on Jun. 15, 2006, which claims priority to JP 2004-351422, filed Dec. 3, 2004, the disclosures of which are incorporated by reference in their entirety herein.

FIELD

The present invention relates to a thermally conductive sheet containing a (meth)acrylic polymer and a thermally conductive filler. More specifically, the present invention relates to a thermally conductive sheet which has high thermal conductivity and superior thermal stability, and a method of production thereof.

BACKGROUND

Nowadays, as electronics are miniaturized and highly integrated, heating density around an exothermic body such as a chip becomes higher and higher, and a thermally conductive sheet having higher thermal conductivity is required. At the same time, a thermally conductive sheet containing a non-silicone resin as a binder component is required because it seldom causes a contact fault in electronics.

As a non-silicone resin sheet or a composition usable in a sheet, there is disclosed, for example, a formed body or a sheet in which a thermally conductive filler is filled in an acrylic resin (see JP-A-2001-310984 and JP-A-2003-238760). There is further disclosed a thermally conductive adhesive containing a (meth)alkyl acrylate monomer and a thermally conductive filler or a thermally conductive adhesive containing a polymerized (meth)alkyl acrylate monomer and a thermally conductive filler (see JP-A-2004-059851 and JP-A-10-316953).

In polyolefin resins, improvement in thermal stability or light stability has variously been tried, and usage of various kinds of thermal stabilizers in systems where a filler such as talc is filled in polyolefin (see Japanese Patent No. 2615829 and Japanese Patent No. 3133375).

However, it is difficult for a (meth)acrylic polymer type thermally conductive sheet as disclosed in the references described above to achieve high thermal conductivity and thermal stability. Particularly, there is a problem that, when the amount of the thermally conductive filler is increased in order to obtain high thermal conductivity, thermal stability is lowered, and the sheet cannot keep flexibility in a certain time period. An olefin resin composition as disclosed in Japanese Patent No. 2615829 or Japanese Patent No. 3133375 has low flexibility and a small amount of thermally conductive filler, which is not suitable for a thermally conductive sheet. Therefore, a non-silicone thermally conductive sheet is required which can have both high thermal conductivity and thermal stability.

SUMMARY

The present invention is to address the aforementioned problems and aims to provide a non-silicone (meth)acrylic polymer type thermally conductive sheet having both high thermal conductivity and thermal stability.

As a result of studies for addressing the above problems by the inventors, it was found out that it is possible to manufacture a (meth)acrylic polymer type thermally conductive sheet containing a thermally conductive filler at high ratio by selecting a thermally conductive filler having a suitable particle size. However, when a thermally conductive filler of a metal oxide or metal hydrate is filled in the sheet at high ratio, thermal stability of the sheet decreases. The decrease in thermal stability seems to be attributed to the fact that metal oxides and metal hydrates show a strong pro-oxidant action because metal oxides and metal hydrates have many hydroxyl groups on the surfaces thereof. In such a system, a synergistic effect in suppressing the thermal oxidation can be obtained by using a combination of a phenolic antioxidant and a sulfur based antioxidant, and an effect in greatly improving the thermal stability is shown. According to the present invention, there is provided the following (meth)acrylic polymer type thermally conductive sheet and method of production thereof.

A thermally conductive sheet comprising:
(A) a (meth)acrylic polymer,
(B) a thermally conductive filler containing aluminum hydroxide,
(C) a phenolic antioxidant, and
(D) a sulfur based antioxidant.

In another aspect, the thermally conductive sheet is formed by curing a thermally conductive composition comprising:
(A') a monomer component containing a (meth)acrylic monomer,
(B) a thermally conductive filler containing aluminum hydroxide,
(C) a phenolic antioxidant, and
(D) a sulfur based antioxidant.

The thermally conductive sheet may contain 0.05 to 2 parts by weight of (C) a phenolic antioxidant with respect to 100 parts by weight of (A) a (meth)acrylic polymer or (A') a monomer component containing a (meth)acrylic monomer.

The thermally conductive sheet may contain 0.5 to 3 parts by weight of (D) a sulfur based antioxidant with respect to 100 parts by weight of (A) a (meth)acrylic polymer or (A') a monomer component containing a (meth)acrylic monomer.

The thermally conductive sheet may contain 10 to 75% by volume of aluminum hydroxide with respect to 100% by volume of thermally conductive sheet or thermally conductive composition containing (A) a (meth)acrylic polymer or (A') a monomer component containing a (meth)acrylic monomer, (B) a thermally conductive filler containing aluminum hydroxide, (C) a phenolic antioxidant, and (D) a sulfur based antioxidant.

The thermally conductive sheet contains at least 55% by volume of (B) thermally conductive filler containing aluminum hydroxide with respect to 100% by volume of thermally conductive sheet or thermally conductive composition containing (A) a (meth)acrylic polymer or (A') a monomer component containing a (meth)acrylic monomer, (B) a thermally conductive filler containing aluminum hydroxide, (C) a phenolic antioxidant, and (D) a sulfur based antioxidant.

A method of production of a thermally conductive sheet, comprising a step of curing a thermally conductive composition comprising: (A') a monomer component containing a (meth)acrylic monomer, (B) a thermally conductive filler containing aluminum hydroxide, (C) a phenolic antioxidant, and (D) a sulfur based antioxidant.

A thermally conductive sheet of the present invention has high thermal conductivity and superior thermal stability since a combination of a phenolic antioxidant and a sulfur based antioxidant is used in a system containing a (meth)acrylic polymer and a thermally conductive filler. In addition, according to a method for producing an acrylic thermally conductive sheet of the present invention, such a thermally conductive sheet can suitably be produced.

DETAILED DESCRIPTION

The present invention is hereinbelow described in detail on the basis of embodiments. However, the present invention is by no means limited to these embodiments. Incidentally, in this specification, "(meth)acrylic" means "acrylic or methacrylic," and "(meth)acrylic monomer" means an acrylic monomer such as acrylic acid or acrylic ester, or a methacrylic monomer such as methacrylic acid or methacrylic ester.

A thermally conductive sheet contains a (meth)acrylic polymer as component (A), a thermally conductive filler containing aluminum hydroxide as component (B), a phenolic antioxidant as component (C), and a sulfur based antioxidant as component (D). Each of the components is hereinbelow described concretely.

Component (A): (meth)acrylic polymer

A (meth)acrylic polymer is a polymer obtained by polymerizing or optionally crosslinking a monomer component (A') containing a (meth)acrylic monomer. The (meth)acrylic monomer is not particularly limited as long as it is a monomer used to form a general (meth)acrylic polymer. Useful examples are monofunctional (meth)acrylic monomers having alkyl groups of 20 or less carbons as ester groups, including ethyl (meth)acrylate, butyl(meth)acrylate, hexyl(meth)acrylate, 2-ethylhexyl(meth)acrylate, octyl(meth)acrylate, isooctyl(meth)acrylate, decyl(meth)acrylate, and dodecyl (meth)acrylate. Useful examples further include acrylic acid and methacrylic acid. Incidentally, one or mixtures of these monofunctional (meth)acrylic monomers may be used. Further, flexibility of the sheet can be controlled by employing at least two kinds of monofunctional (meth)acrylate having different carbon numbers.

It is also desirable that the monomer component (A') contains a polyfunctional (meth)acrylic monomer in addition to the above monofunctional (meth)acrylic monomer. The monomer component (A') containing a polyfunctional (meth)acrylic monomer can be crosslinked and enhance strength of the sheet. A polyfunctional (meth)acrylic monomer is preferably a compound having two or more functional groups selected from the group consisting of an acryloxy group and a methacryloxy group. Useful examples include: di(meth)acrylates such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, and bisphenol A dimethacrylate; tri(meth)acrylates such as trimethylol propane triacrylate, trimethylol propane trimethacrylate, pentaerythritol monohydroxy triacrylate, and trimethylol propane triethoxy triacrylate; tetraacrylates such as pentaerythritol tetraacrylate, and di(trimethylol propane) tetraacrylate; and pentaacrylate such as dipentaerythritol (monohydroxy) pentaacrylate. One or mixtures of these polyfunctional (meth)acrylic monomers may be used.

When the monomer component (A') contains a polyfunctional (meth)acrylic monomer as described above, there is no limitation with regard to the content. However, when the content is too small, an effect in crosslinking by the polyfunctional (meth)acrylic monomer is sometimes insufficient. When the content is too high, the sheet sometimes has low flexibility. The content is generally 0.01 to 5 parts by weight with respect to 100 parts by weight of monofunctional (meth)acrylic monomer.

Component (B): Thermally Conductive Filler

A thermally conductive filler is a component necessary for a thermally conductive sheet to exhibit substantial thermal conductivity. A thermally conductive filler employed contains aluminum hydroxide. A thermally conductive sheet containing a thermally conductive filler containing aluminum hydroxide component can have superior filling ability of the filler and superior flame retardancy. Further, the thermally conductive filler may contain, in addition to aluminum hydroxide, another metal hydrate and/or a metal oxide. The thermally conductive composition generally contains at least 10% by volume of aluminum hydroxide in order to sufficiently exhibit flame retardancy. In addition, the thermally conductive composition generally contains at most 75% by volume of aluminum hydroxide so as not to detract flexibility as a thermally conductive sheet or not to have difficulty in filling the filler.

Examples of the metal oxide include aluminum oxide, magnesium oxide, beryllium oxide, titanium oxide, zirconium oxide, and zinc oxide. Among these, aluminum oxide (alumina) is particularly preferable in that it has high thermal conductivity and it can be easily filled at high ratio. Since a metal hydrate also functions as a flame retardant, it is preferable that a thermally conductive sheet contains metal hydrate other than aluminum hydroxide. Examples of metal hydrate other than aluminum hydroxide include magnesium hydroxide, barium hydroxide, calcium hydroxide, dawsonite, hydrotalcite, zinc borate, calcium aluminate, and zirconium oxide hydrate.

The thermally conductive sheet may further contain another thermally conductive filler besides the aforementioned thermally conductive filler. Examples of another thermally conductive filler include boron nitride, aluminum nitride, silicon nitride, boron carbide, aluminum carbide, and silicon carbide.

Generally, these thermally conductive fillers are added to the material in the form of particles. Use of a combination of a group of relatively large particles having the average particle diameter of 5 to 50 μm and a group of relatively small particles having the average particle diameter of below 5 μm can increase the amount of the thermally conductive filler to be added to the material. Further, strength (for example, tensile strength) of the resultant thermally conductive sheet can be enhanced by subjecting a thermally conductive filler to a surface treatment with a silane coupling agent, a titanate coupling agent, fatty acid, or the like. Among these, a titanate coupling agent is particularly preferable from the view point of a production process since a titanate coupling agent has a superior effect in lowering viscosity of a thermally conductive composition containing large amount of filler. Incidentally, though a thermally conductive filler may be subjected to a surface treatment with such a surface-treating agent in advance before the filler is mixed with other components, an effect of a surface treatment can be exhibited even if a surface-treating agent is added to a thermally conductive composition together with a thermally conductive filler and mixed with them, and then cured.

The thermally conductive sheet has a thermal conductivity of preferably 1 W/m·K or more, and more preferably 3 W/m·K or more. Therefore, it is desirable that the content of the thermally conductive filler is high from the viewpoint of enhancing thermal conductivity. The content of the thermally conductive filler in the thermally conductive composition is generally 55% by volume or more with respect to 100% by volume of the thermally conductive composition. On the other hand, when the content of the thermally conductive filler is too high, a sheet obtained is sometimes brittle, or it sometimes makes production of a sheet difficult. Therefore, the content of the thermally conductive filler is generally 85% by volume or less with respect to 100% by volume of the thermally conductive composition. In the case that the content of the thermally conductive filler is very high, an effect of a combination of a phenolic antioxidant and a sulfur based antioxidant is shown more clearly. Therefore, a present invention is particularly effective in the case that the content of the thermally conductive filler is very high, particularly 55% by volume or more with respect to 100% by volume of the thermally conductive composition. The total content of metal hydrate including aluminum hydroxide in the thermally conductive composition is generally 10% by volume or more from the viewpoint of flame retardancy.

Component (C): Phenolic Antioxidant

As a phenolic antioxidant, there may be employed a generally used one such as monophenolic, bisphenolic, or polyphenolic antioxidant. Examples of a phenolic antioxidant include a monophenolic antioxidant such as 2,6-di-tert-butyl-p-cresol, tert-butyl hydroxyanisole, 2,6-di-tert-butyl-4-ethylphenol, and stearyl-β-(3,5-di-tert-butyl-4-hydroxyphenyl)propionate; a bisphenolic antioxidant such as 2,2'-methylene-bis(4-methyl-6-tert-butylphenol), 2,2'-methylene-bis(4-ethyl-6-tert-butylphenol), 4,4'-thiobis(3-methyl-6-tert-butylphenol), 4,4'-butylidene-bis(3-methyl-6-tert-butylphenol), and triethyleneglycol-bis[3-(3-tert-butyl-4-hydroxy-5-methylphenyl)propionate]; and a polyphenolic antioxidant such as 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxybenzyl)isocyanurate, and tetrakis[methylene-3-(3',5'-di-tert-butyl-4'-hydroxyphenyl)propionate]methane. One or mixtures of these phenolic antioxidants may be used.

Though there is no particular limitation with regard to an amount of the phenolic antioxidant, when it is too small, sometimes sufficiently-improved thermal stability cannot be exhibited. Therefore, the phenolic antioxidant is generally contained by 0.05 part by weight or more per 100 parts by weight of (A) a (meth)acrylic polymer or (A') a monomer component containing a (meth)acrylic monomer. On the other hand, when an amount of the phenolic antioxidant is too large, bleeding is sometimes caused. Further, in the case that a sheet is formed by mixing a thermally conductive filler with a monomer component, and then curing the mixture, the curing speed is sometimes lowered. Therefore, the phenolic antioxidant is generally contained by 2 parts by weight per 100 parts by weight of (A) a (meth)acrylic polymer or (A') a monomer component containing a (meth)acrylic monomer. Incidentally, in the present invention, due to a synergistic effect by using a combination of a phenolic antioxidant and a sulfur based antioxidant, sufficient thermal stability can be obtained even by a small amount of the antioxidants, which enables to reduce the amount of phenolic antioxidant to be added. Therefore, a combination of a phenolic antioxidant and a sulfur based antioxidant is particularly effective in that thermal stability can be improved without seriously impeding a curing reaction in the case that a sheet is formed by curing after mixing a thermally conductive filler with a monomer component as described above.

Component (D) Sulfur Based Antioxidant

As a sulfur based antioxidant, there may be employed a generally used one such as a thioether based antioxidant. Useful examples include thiodipropionate and alkylthiopropionate. The concrete examples include di-lauryl thiodipropionate, di-stearyl thiodipropionate, di-myristyl thiodipropionate, di-tridecyl thiodipropionate, and pentaerythrityl tetrakis(3-laurylthiopropionate). One or mixtures of these sulfur based antioxidants may be used.

Though there is no particular limitation with regard to an amount of the sulfur based antioxidant, when it is too small, sometimes sufficiently-improved thermal stability cannot be exhibited. Therefore, the sulfur based antioxidant is generally contained by 0.05 part by weight or more per 100 parts by weight of (A) a (meth)acrylic polymer or (A') a monomer component containing a (meth)acrylic monomer. On the other hand, when an amount of the sulfur based antioxidant is too large, an odor is sometimes emitted. Therefore, the sulfur based antioxidant is generally contained by 3 parts by weight per 100 parts by weight of (A) a (meth)acrylic polymer or (A') a monomer component containing a (meth)acrylic monomer.

A phosphorous based antioxidant may further be used together with the above antioxidants so as to further improve stability of the thermally conductive sheet against heat or light. Useful examples of the phosphorous based antioxidant include tris(2,4-di-tert-butylphenyl)phosphite, bis(2,4-di-tert-butylphenyl)pentaerythritol diphosphite, bis(2,6-di-tert-butyl-4-methylphenyl)pentaerythritol diphosphite, tetrakis(2,4-di-tert-butylphenyl)-4,4'-biphenylene diphosphonite.

Other Additives

Various kinds of additives may be added to the materials for the thermally conductive sheet of the present embodiments as long as the characteristics of the thermally conductive sheet are not spoiled. Examples of the additive include: tackifiers, plasticizers, flame retardants, flame retarding auxiliaries, precipitation inhibitors, thickeners, thixotropic agents such as ultra-fine silica powder, surfactants, antifoamers, colorants, electrically conductive particles, antistatic agents, and metal deactivators. Incidentally, one or mixtures of these additives may be used.

Next, description is given with regard to a method for manufacturing a thermally conductive sheet of the present invention. A thermally conductive sheet of the present embodiment may be manufactured according to a method described in conventionally-known documents such as JP-A-11-292998, JP-A-10-316953, and JP-A-10-330575.

A thermally conductive sheet can be obtained by adding, as necessary, a polymerization initiator to a thermally conductive composition containing (A') a monomer component, (B) a thermally conductive filler, (C) a phenolic antioxidant, and (D) a sulfur based antioxidant; deaerating and mixing them with a planetary mixer, or the like, to obtain a mixture, forming the mixture in the shape of a sheet, and curing the formed body in the shape of a sheet by polymerization and, as necessary, crosslinking. This method enables to fill a thermally conductive filler at high ratio, for example 55% by volume with respect to 100% by volume of the thermally conductive composition. Therefore, this method is particularly suitable for manufacturing a thermally conductive sheet containing a large amount of thermally conductive filler.

Polymerization can be performed in various manners, for example, thermal polymerization, ultraviolet polymerization, electron beam polymerization, gamma-ray polymerization, and ion-beam polymerization. When the thermally conductive composition is thermally polymerized, a suitable amount of thermal polymerization initiator may be contained in the thermally conductive composition, and the formed body in the shape of a sheet is heated at about 50 to 200° C. When the thermally conductive composition is subjected to ultraviolet polymerization, a suitable amount of photopolymerization initiator may be contained in the thermally conductive composition, and the formed body in the shape of a sheet is irradiated with ultraviolet radiation. However, when a large amount of thermally conductive filler is used, transmission of ultraviolet radiation is sometimes limited. In such a case, thermal polymerization is preferably employed in place of ultraviolet polymerization. Incidentally, it is preferred to conduct polymerization under an inert gas atmosphere such as nitrogen gas atmosphere to suppress inhibition of polymerization by oxygen. In addition, when polymerization is conducted by the use of particle beam like electron beam polymerization, no polymerization initiator is required generally.

Examples of the thermal polymerization initiator include organic peroxides such as diacyl peroxides, peroxy ketals, ketone peroxides, hydro peroxides, dialkyl peroxides, peroxy esters, and peroxydicarbonates. More specific examples of the organic peroxides include: lauroyl peroxide, benzoyl peroxide, cyclohexanone peroxide, 1,1-bis(t-butylperoxy)3,3,5-trimethylcyclohexane, and tert-butyl hydro peroxide. Incidentally, a combination of persulfate and bisulfite can also be used.

Examples of photopolymerization initiators include: benzoin ethers such as benzoin ethyl ether and benzoin isopropyl ether; anisoin ethyl ether, anisoin isopropyl ether, Michler's ketone (4,4'-tetramethyldiaminobenzophenone); and substituted acetophenones such as 2,2-dimethoxy-2-phenylacetophenone (for example, commercial name: KB-1 produced by Sartomer Co., Inc. and commercial name: IRGACURE 651 produced by Ciba Specialty Chemicals K.K.), 2,2-diethoxyacetophenone. Other examples include: substituted α-ketols such as 2-methyl-2-hydroxypropiophenone, aromatic sulphonylchlorides such as 2-naphthalenesulphonylchloride, and photoactive oxime compounds such as 1-phenone-1,1-propanedion-2-(o-ethoxycarbonyl) oxime. In addition, the above thermal polymerization initiators and photo polymerization initiators may be used in any combination. No limitation is given to the content of the polymerization initiator. However, the content is generally 0.1 to 2.0 parts by weight with respect to 100 parts by weight of the (A') monomer component.

The (A') monomer may be prepolymerized before mixing with a thermally conductive filler to increase viscosity. Prepolymerization is generally performed until the viscosity becomes about 5 to 10000 mPa·s. Prepolymerization can be performed in various manners, for example, thermal polymerization, ultraviolet polymerization, electron beam polymerization, gamma-ray polymerization, and ion-beam polymerization. When prepolymerization is performed by heat or ultraviolet radiation, a polymerization initiator such as thermal polymerization initiators and photopolymerization initiators may be added to the monomer component.

A thermally conductive sheet as described above is disposed between a heat sink, a heat radiator, or the like, and electronic parts, particularly, semiconductor electronic parts such as a power transistor, a graphic integrated circuit (IC), a chip set, a memory set, and central processing unit (CPU), and used to suitably transmit heat between them. The thickness of a thermally conductive sheet is not particularly limited. However, the thickness may be 0.1 mm or more from the viewpoint of practical manufacturability and handleability.

EXAMPLE

The present invention is hereinbelow described specifically on the basis of Examples. However, the present invention is by no means limited to the Examples.

Example 1 and Comparative Examples 1 to 3

Each of the binder components shown in Table 1 was put in a planetary mixer altogether and kneaded for 30 minutes under reduced pressure (50 mmHg) to obtain each thermally conductive composition. The content of a thermally conductive filler in each thermally conductive composition is shown in Table 2. Each of the thermally conductive compositions was held by two poly(ethylene terephthalate) (PET) liners treated with a silicone mold lubricant, and the composition was subjected to calendering to give a sheet having a thickness of 1 mm (excluding the thickness of the PET liners) after the sheet is cured. The obtained formed sheet was heated at 140° C. for 15 minutes in an oven to obtain a thermally conductive sheet having a thickness of 1 mm.

TABLE 1

| | Binder component | | | |
|---|---|---|---|---|
| | Content (parts by weight) | | | |
| Composition | Example 1 | Comparative Example 1 | Comparative Example 2 | Comparative Example 3 |
| 2-ethylhexyl acrylate | 100 | 100 | 100 | 100 |
| 1,6-hexanedioldiacrylate (crosslinking agent) | 0.3 | 0.3 | 0.3 | 0.25 |
| tetraethyleneglycol-di-2-ethylhexanoate (plasticizer) | 40 | 40 | 40 | 25 |
| IRGANOX1076*[1] (phenolic antioxidant) | 0.5 | 0.9 | — | 0.3 |
| A0-412S*[2] (sulfur based antioxidant) | 0.5 | — | 0.9 | — |
| PERHEXA TMH*[3] (thermal polymerization initiator) | 0.7 | 0.7 | 0.7 | 0.7 |
| TITACOAT S-151*[4] (titanate-based coupling agent) | 5 | 5 | 5 | 2 |

*[1] Commercial name (produced by Ciba Specialty Chemicals K.K.)
*[2] Commercial name (produced by Asahi Denka Co., Ltd.)
*[3] Commercial name (produced by NOF Corp.)
*[4] Commercial name (produced by Nippon Soda Co., Ltd.)

TABLE 2

Content of thermally conductive filler in sheet (% by volume)

| Kind of thermally conductive filler | Content (% by volume) | | | |
|---|---|---|---|---|
| | Example 1 | Comparative Example 1 | Comparative Example 2 | Comparative Example 3 |
| Aluminum hydroxide*[5] (metal hydrate) | 23.0 | 23.0 | 23.0 | 56.8 |
| Alumina*[6] (metal oxide) | 47.0 | 47.0 | 47.0 | — |
| Total thermally conductive filler | 70.0 | 70.0 | 70.0 | 56.8 |

*[5]Commercial name H34 (produced by Showa Denko K.K.)
*[6]Commercial name DAM45 (produced by Denki Kagaku Kogyo Kabushiki Kaisha)

Examples 2 to 6 and Comparative Examples 4 to 8

Each thermally conductive sheet having a thickness of 1 mm was obtained in the same manner as in Example 1 except that the binder components and contents shown in the Tables 3 and 4 were employed. The content of a thermally conductive filler in each thermally conductive composition is shown in Tables 5 and 6. In Example 4, two kinds of (meth)acrylate having different carbon numbers were used. In Example 5, acrylic acid, which is a polar monomer, was used. Incidentally, since a composition containing the components of Comparative Example 8 at the ratio has very high viscosity, coating the composition to the PET liner was difficult, and a sheet could not be formed.

TABLE 3

Binder component

| Composition | Content (parts by weight) | | | | |
|---|---|---|---|---|---|
| | Example 2 | Example 3 | Comparative Example 4 | Comparative Example 5 | Comparative Example 6 |
| 2-ethylhexyl acrylate | 100 | 100 | 100 | 100 | 100 |
| 1,6-hexanedioldiacrylate (crosslinking agent) | 0.3 | 0.25 | 0.3 | 0.3 | 0.3 |
| tetraethyleneglycol-di-2-ethylhexanoate (plasticizer) | 40 | 25 | 40 | 40 | 40 |
| IRGANOX1076 (phenolic antioxidant) | 0.5 | 0.3 | 0.3 | 5.0 | — |
| AO-23*[7] (sulfur based antioxidant) | 0.5 | — | — | — | — |
| AO-412S (sulfur based antioxidant) | — | 0.6 | — | — | — |
| LA-62*[8] (hindered amine based antioxidant) | — | — | 0.6 | — | 1.0 |
| PERHEXA TMH (thermal polymerization initiator) | 0.7 | 0.7 | 0.7 | 0.7 | 0.7 |
| TITACOAT S-151 (titanate-based coupling agent) | 5 | 2 | 5 | 5 | 5 |

*[7], *[8]Commercial name (produced by Asahi Denka Co., Ltd.)

TABLE 4

Binder component

| Composition | Content (parts by weight) | | | | |
|---|---|---|---|---|---|
| | Example 4 | Example 5 | Example 6 | Comparative Example 7 | Comparative Example 8 |
| 2-ethylhexyl acrylate | 70 | 99.5 | 100 | 100 | 100 |
| n-butyl acrylate | 30 | — | — | — | — |
| acrylic acid | — | 0.5 | — | — | — |
| 1,6-hexanedioldiacrylate (crosslinking agent) | 0.035 | 0.1 | 0.4 | 0.4 | 0.3 |
| tetraethyleneglycol-di-2-ethylhexanoate (plasticizer) | 60 | 25 | 30 | 20 | 20 |
| IRGANOX1076 (phenolic antioxidant) | — | — | 0.5 | 0.3 | 0.3 |
| IRGANOX1010*[9] (phenolic antioxidant) | 0.4 | 0.4 | — | — | — |
| AO-23 (sulfur based antioxidant) | — | 0.4 | — | — | 0.6 |
| AO-412S (sulfur based antioxidant) | 0.8 | — | 1 | — | — |
| PERHEXA TMH (thermal polymerization initiator) | 0.7 | 0.7 | 0.7 | 0.7 | 0.7 |
| TITACOAT S-151 (titanate-based coupling agent) | 4 | 2 | 4 | 2 | 4 |

*[9]Commercial name (produced by Ciba Specialty Chemicals K.K.)

TABLE 5

Content of thermally conductive filler in sheet (% by volume)

| | Content (% by volume) | | | | |
|---|---|---|---|---|---|
| Kind of thermally conductive filler | Example 2 | Example 3 | Comparative Example 4 | Comparative Example 5 | Comparative Example 6 |
| Aluminum hydroxide (metal hydrate) | 23.0 | 56.8 | 23.0 | 23.0 | 23.0 |
| Alumina (metal oxide) | 47.0 | — | 47.0 | 47.0 | 47.0 |
| Total thermally conductive filler | 70.0 | 56.8 | 70.0 | 70.0 | 70.0 |

TABLE 6

Content of thermally conductive filler in sheet (% by volume)

| | Content (% by volume) | | | | |
|---|---|---|---|---|---|
| Kind of thermally conductive filler | Example 4 | Example 5 | Example 6 | Comparative Example 7 | Comparative Example 8* |
| Aluminum hydroxide*[5] (metal hydrate) | 50.4 | 56.8 | 5.8 | — | — |
| Magnesium hydroxide*[10] (metal hydrate) | — | — | — | — | 57.7 |
| Alumina*[6] (metal oxide) | 17.7 | — | 52.7 | — | — |
| Silicon Carbide*[11] | — | — | — | 60.4 | — |
| Total thermally conductive filler | 68.1 | 56.8 | 58.5 | 60.4 | 57.7 |

*Comparative Example 8 is for reference since a sheet could not formed.
*[10]Commercial name KISUMA 5J (produced by Kyowa Chemical Industry Co., Ltd.)
*[11]Commercial name CP240 (produced by Nanko Abrasives Industry Co., Ltd.)

Each of the thermally conductive sheets obtained was measured for a change in hardness with the passage of time by the following method, which was employed as an index of thermal stability. In addition, thermal conductivity was measured by the following method.

Change in Hardness

A sample for measurement was obtained by piling up 10 thermally conductive sheets obtained in each of Example 1 and Comparative Examples 1 to 3 (with the compositions shown in Tables 1 and 2). The sample was measured for initial hardness under a load of 1 kg by an Asker C hardness meter. Then, the sample was kept in an oven at 110° C. for 4 weeks. Then, the sample was cooled down to 25° C. for measuring of hardness. A rate of change in hardness $\Delta H(\%)$ was obtained from the initial hardness and the hardness after 4 weeks obtained above. Here, it is shown that a sample having smaller $\Delta H$ keeps flexibility more and superior thermal stability.

$$\Delta H(\%)=\{[(\text{hardness after 4 weeks})-(\text{initial hardness})/\text{initial hardness}\}\times 100$$

A rate of change in hardness $\Delta H(\%)$ for each of the thermally conductive sheets manufactured in Examples 1 to 6 and Comparative Examples 1 to 7 was obtained in the same manner as described above except that the sample was kept in an oven at 180° C. for 12 hours. Incidentally, the sample obtained in Comparative Example 8 could not form into a sheet, and therefore, could not be evaluated.

Thermal Conductivity

A piece having dimensions of 0.01 m×0.01 m (area of $1.0\times10^{-4}$ m$^2$, thickness of L(m)) was cut out from each of the thermally conductive sheets. The piece was held by a heating plate and a cooling plate, and an electric power of 4.8 W was applied under a constant load of $7.6\times10^4$ N/m$^2$ for 5 minutes. At that time, a difference in temperature between the heating plate and the cooling plate was measured, and the thermal resistance $R_L$ was obtained by the following formula. Incidentally, "measured area" in the following formula is the area of the above piece.

$$R_L(K\cdot m^2/W)=\text{Temperature difference }(K)\times \text{measured area }(m^2)/\text{electric power }(W)$$

Further, a sample was formed by joining two pieces (thickness of 2L) and measured for the thermal resistance $R_{2L}$ (K·m$^2$/W) in the same manner as described above. The thermal conductivity $\lambda$ (W/m·K) was obtained by the following formula using $R_L$ and $R_{2L}$.

$$\lambda(W/m\cdot K)=(2L(m)-L(m))/(R_{2L}(K\cdot m^2/W)-R_L(K\cdot m^2/W))$$

Results of the evaluations are shown in Tables 7 and 8. As shown in Table 7, the sheet of Example 1, which employed a combination of a phenolic antioxidant and a sulfur based antioxidant, exhibited good thermal stability in spite of a high content of thermally conductive filler. In addition, the sheet exhibited very high thermal conductivity since the sheet has a high content of thermally conductive filler. Each of the sheets of Comparative Examples 1 and 2, which employed either a phenolic antioxidant or a sulfur based antioxidant alone, exhibited low thermal stability. In addition, the sheet in Comparative Example 3, which has a relatively small content of a thermally conductive filler, exhibited low thermal stability under the temperature conditions shown in Table 8 though it exhibited good thermal stability under the temperature conditions shown in Table 7.

As shown in Table 8, the sheets in Examples 1 to 6, which employed a combination of a phenolic antioxidant and a sulfur based antioxidant, exhibited good thermal stability even under higher-temperature conditions. The sheet, which employed a phenolic antioxidant alone, did not exhibit good thermal stability even when the amount of the antioxidant was increased (see Comparative Example 5). In addition, in Comparative Example 5, where an increased amount of a phenolic antioxidant was used, a surface of the sheet became sticky due to polymerization inhibition, and an odor of acrylic monomer was remarkable. Such phenomena are not preferable from the viewpoint of workability or influence on environment. Incidentally, though it is not shown in the Tables, when a phenolic antioxidant is used alone, and the content was increased up to 15 parts by weight, the component was not cured, and a sheet could not be obtained.

In both the case of employing a hindered amine based antioxidant alone and the case of employing a combination of a hindered amine based antioxidant and a phenolic antioxidant, low thermal stability was shown (see Comparative Examples 4 and 6). Incidentally, the sheet in Comparative Example 6, where 1.0 part by weight of a hindered amine based antioxidant was added, had blooming on a surface thereof and showed low handleability.

Further, each of the sheets obtained was evaluated for flame retardancy on the basis of the Underwriters Laboratories Inc. Standard No. 94 "Test for Flammability of Plastic Materials (1996)" (hereinbelow referred to as UL94 standard). As a result, the sheets other than the sheets obtained in Example 6 and Comparative Example 7 showed flame retardancy which cleared V-2 of UL94. However, the sheet obtained in Comparative Example 7 could not clear the standard. The sheet obtained Example 6 exhibited an improved effect of thermal stability of the present invention due to the use of a phenolic antioxidant and a sulfur based antioxidant in combination. However, the sheet was not good as the sheets in the other Examples in flame retardancy because of a small amount of aluminum hydroxide. Incidentally, a test on the basis of the UL94 standard is often employed for evaluation of flame retardancy. It is usually desirable to have a flame retardancy of V-2 or more.

TABLE 7

|  | Hardness (ASKER C) | | | Thermal conductivity |
|---|---|---|---|---|
|  | Initial | After 4 weeks | ΔH(%) | (W/m · K) |
| Example 1 | 45 | 48 | 6.7 | 5.8 |
| Comp. Ex. 1 | 45 | 81 | 80.0 | 5.8 |
| Comp. Ex. 2 | 45 | 79 | 75.6 | 5.8 |
| Comp. Ex. 3 | 37 | 38 | 2.7 | 1.9 |

Aging test at 110° C. for 4 weeks

TABLE 8

|  | Hardness (ASKER C) | | | Thermal conductivity |
|---|---|---|---|---|
|  | Initial | After 12 hours | ΔH(%) | (W/m · K) |
| Example 1 | 45 | 60 | 33.3 | 5.8 |
| Example 2 | 45 | 52 | 13.5 | 5.8 |
| Example 3 | 37 | 41 | 10.8 | 1.9 |
| Example 4 | 50 | 55 | 10 | 4.5 |
| Example 5 | 48 | 54 | 12.5 | 1.9 |
| Example 6 | 38 | 45 | 18.4 | 2.6 |
| Comp. Ex. 1 | 45 | 83 | 84.4 | 5.8 |
| Comp. Ex. 2 | 45 | 92 | 104.4 | 5.8 |
| Comp. Ex. 3 | 37 | 75 | 102.7 | 1.9 |
| Comp. Ex. 4 | 45 | 79 | 75.6 | 5.8 |
| Comp. Ex. 5 | 41 | 69 | 68.3 | 5.8 |
| Comp. Ex. 6 | 44 | 72 | 63.6 | 5.8 |
| Comp. Ex. 7 | 46 | 56 | 21.7 | 2.4 |
| Comp. Ex. 8 | — | — | — | — |

Aging test at 180° C. for 12 hours

As described above, a thermally conductive sheet of the present invention has superior thermal stability and can suitably be used as a thermally conductive sheet for electronics. In addition, a method of production of a thermally conductive sheet of the present invention enables to suitably produce such a thermally conductive sheet.

What is claimed is:

1. An electronic device comprising:
   a thermally conductive sheet including (a) a methacrylic polymer, (b) a thermally conductive filler containing aluminum hydroxide in an amount of at least 10% by volume of the thermally conductive sheet, (c) a combination of a phenolic antioxidant and a sulfur based antioxidant in an amount sufficient to impart thermal stability to the thermally conductive sheet; and
   a heat radiator.

2. The electronic device of claim 1 wherein the thermally conductive sheet includes 0.05 to 2 parts by weight of the phenolic antioxidant with respect to 100 parts by weight of the methacrylic polymer.

3. The electronic device of claim 1 wherein the thermally conductive sheet includes 0.05 to 3 parts by weight of the sulfur based antioxidant with respect to 100 parts by weight of the methacrylic polymer.

4. The electronic device of claim 1 wherein the thermally conductive sheet includes 10 to 75 parts by volume of aluminum hydroxide with respect to 100 parts by volume of thermally conductive sheet containing the methacrylic polymer, thermally conductive filler containing aluminum hydroxide, phenolic antioxidant, and sulfur based antioxidant.

5. The electronic device of claim 1 wherein the thermally conductive sheet includes at least 55 parts by volume of the thermally conductive filler containing aluminum hydroxide with respect to 100 parts by volume of thermally conductive sheet containing methacrylic polymer, thermally conductive filler containing aluminum hydroxide, phenolic antioxidant, and sulfur based antioxidant.

6. The electronic device of claim 5, wherein the thermally conductive sheet includes 0.05 to 3 parts by weight of the sulfur based antioxidant with respect to 100 parts by weight of the methacrylic polymer.

7. The electronic device of claim 1, wherein the thermally conductive sheet is formed by curing a thermally conductive composition comprising:
   (A') a monomer component containing a (meth)acrylic monomer;
   (B) a thermally conductive filler containing aluminum hydroxide in an amount of at least 10% by volume of the thermally conductive composition;
   (C) a phenolic antioxidant; and
   (D) a sulfur based antioxidant.

8. The electronic device of claim 7 wherein the thermally conductive composition includes 0.05 to 2 parts by weight of (C) phenolic antioxidant with respect to 100 parts by weight of (A') monomer component containing a (meth)acrylic monomer.

9. The electronic device of claim 7, wherein the thermally conductive composition includes 0.05 to 3 parts by weight of (D) sulfur based antioxidant with respect to 100 parts by weight of (A') monomer component containing a (meth)acrylic monomer.

10. The electronic device of claim 7, wherein the thermally conductive composition includes 10 to 75 parts by volume of aluminum hydroxide with respect to 100 parts by volume of thermally conductive composition containing the (A') monomer component containing a (meth)acrylic monomer, (B)

thermally conductive filler containing aluminum hydroxide, (C) phenolic antioxidant, and (D) sulfur based antioxidant.

11. The electronic device of claim 7, wherein the thermally conductive composition includes at least 55 parts by volume of (B) thermally conductive filler containing aluminum hydroxide with respect to 100 parts by volume of thermally conductive composition containing (A') monomer component containing a (meth)acrylic monomer, (B) thermally conductive filler containing aluminum hydroxide, (C) phenolic antioxidant, and (D) sulfur based antioxidant.

12. The electronic device of claim 11, wherein the thermally conductive composition includes 0.05 to 3 parts by weight of (D) sulfur based antioxidant with respect to 100 parts by weight of (A') monomer component containing a (meth)acrylic monomer.

13. A method of production of an electronic device comprising:

providing a heat source and a heat radiator and providing therebetween a thermally conductive sheet, wherein the thermally conductive sheet is provided by curing a thermally conductive composition comprising a monomer component containing a (meth)acrylic monomer, a thermally conductive filler containing aluminum hydroxide in an amount of at least 10% by volume of the thermally conductive composition, a phenolic antioxidant, and a sulfur based antioxidant.

14. The method of claim 13 wherein the thermally conductive composition includes 0.05 to 3 parts by weight of sulfur based antioxidant with respect to 100 parts by weight of monomer component containing a (meth)acrylic monomer and 0.05 to 2 parts by weight of phenolic antioxidant with respect to 100 parts by weight of monomer component containing a (meth)acrylic monomer.

* * * * *

UNITED STATES PATENT AND TRADEMARK OFFICE
CERTIFICATE OF CORRECTION

| | | |
|---|---|---|
| PATENT NO. | : 7,956,116 B2 | Page 1 of 1 |
| APPLICATION NO. | : 12/569562 | |
| DATED | : June 7, 2011 | |
| INVENTOR(S) | : Masaki Yoda | |

It is certified that error appears in the above-identified patent and that said Letters Patent is hereby corrected as shown below:

<u>On the Title Page</u>:
Insert Item --(73) Assignee: 3M Innovative Properties Company, St. Paul, Minnesota--

Signed and Sealed this
Ninth Day of August, 2011

David J. Kappos
*Director of the United States Patent and Trademark Office*